United States Patent
Liu et al.

(10) Patent No.: US 6,728,436 B2
(45) Date of Patent: Apr. 27, 2004

(54) OPTICAL SIGNAL MODULATION METHOD AND OPTICAL SIGNAL TRANSMISSION SYSTEM FOR HIGH SPEED TRANSMISSION SYSTEM

(75) Inventors: Yue Liu, Shenzhen (CN); Changchun Li, Shenzhen (CN)

(73) Assignee: Huawei Technologies, Co., Ltd. (CN)

( * ) Notice: Subject to any disclaimer, the term of this patent is extended or adjusted under 35 U.S.C. 154(b) by 0 days.

(21) Appl. No.: 10/242,973

(22) Filed: Sep. 13, 2002

(65) Prior Publication Data

US 2003/0123771 A1 Jul. 3, 2003

Related U.S. Application Data

(63) Continuation of application No. PCT/CN02/00422, filed on Jun. 14, 2002.

(51) Int. Cl.$^7$ .................................. G02B 6/28
(52) U.S. Cl. .................. 385/24; 385/3; 385/5; 359/238; 359/259; 359/276; 359/279; 359/284
(58) Field of Search ................... 385/1–10, 24; 359/238–245, 259, 276, 279, 284, 286, 289

(56) References Cited

U.S. PATENT DOCUMENTS

| | | | |
|---|---|---|---|
| 5,745,613 A | * | 4/1998 | Fukuchi et al. ............... 385/24 |
| 6,282,334 B1 | * | 8/2001 | Hodgson et al. .............. 385/12 |
| 2002/0141510 A1 | * | 10/2002 | Sridharan et al. ........... 375/300 |

* cited by examiner

*Primary Examiner*—Rodney Bovernick
*Assistant Examiner*—Jennifer Doan
(74) *Attorney, Agent, or Firm*—Palmer & Dodge, LLP; Kathleen M. Williams

(57) ABSTRACT

The invention relates to an optical signal transmission system with phase modulation and the implementation method. The system adds a phase modulator in the optical signal-emitting module. The optical pulses after intensity modulation and a high-speed data stream are input to the phase modulator synchronously, where the optical pulses are modulated in phase according to the high-speed data stream into high-speed optical signals with chattering. According to the invention, the phase modulator added in the optical signal-emitting module modulates optical signals in phase, which has been modulated in intensity. Appropriate chattering modulation can depress effectively the non-linear effect in the transmission of optical pulses through the interaction between chromatic dispersion and non-linear effects. Thus, the power input of individual channels is increased effectively, and the passive relay regeneration distance is extended.

4 Claims, 4 Drawing Sheets

OPTICAL SIGNAL MODULATION METHOD AND OPTICAL SIGNAL TRANSMISSION SYSTEM FOR HIGH SPEED TRANSMISSION SYSTEM

This application is a continuation which claims priority under 35 U.S.C § 120 to PCT Application No. PCT/CN02/00422, filed Jun. 14, 2002 and 35 U.S.C §119 to CN 01140591.0, filed Nov. 11, 2002, the entirety of which is incorporated herein by reference.

FIELD OF THE INVENTION

The invention relates to an optical signal modulation method and an optical signal transmission system for the high-speed transmission systems such as Time Division Multiplexing (TDM) or Dense Wavelength Division Multiplexing (DWDM).

BACKGROUND OF THE INVENTION

The introduction of optical fiber amplifier technology in EDFA (Erbium-doped Fiber Amplifier) overcomes the problem of optical power loss during transmission in a TDM/DWDM system and increase significantly the permitted transmission distance. However, the inherent noise in EDFA degrades the Signal-to-Noise Ratio (SNR) of the system and limits the further extension of passive relay transmission distance. Although the value of SNR can be increased with the strengthening of power input in a single channel, higher power input will contribute to non-linear effect and distortion of pulse form in the optical signal due to chromatic dispersion effect, which will degrade significantly the quality of optical signal transmission. For a DWDM system, the non-linear effect and chromatic dispersion effect will influence much more the optical signal transmission because multi-channel information carried on different wavelengths transmits in an optical fiber.

In order to overcome the Amplified Stimulated Emitting (ASE) noise of EDFA and non-linear effect by high power input and to extend the distance of passive relay transmission, many technologies (Forward Error Correction (FEC), RAMAN Amplification, etc.) are employed in optical signal transmission systems, such as a DWDM system. And commercial systems supporting above 4000 km for passive relay distance are available now. However, the systems are usually used in submarine environments due to its strict requirements for ambient environment and technologies as well as high cost resulting from RAMAN Amplification. And it isn't practical in common optical signal transmission systems.

SUMMARY OF THE INVENTION

The object of the present invention is to provide an optical signal modulation method that can depress effectively the non-linear effect in the transmission of optical signal to extend the distance of passive relay transmission in optical signal transmission systems, and long distance passive relay optical fiber transmission systems with low cost is thus available. Such an optical signal modulation method comprises of the following procedures:

a. A continuous waveform laser generates optical signals, and a high-speed data signal driver generates a high-speed data stream;

b. The optical signals and high-speed data stream are input to an intensity modulator synchronously, where the optical signals are modulated into optical intensity pulses according to the high-speed data stream;

c. The optical intensity pluses modulated and the high-speed data stream are input to a phase modulator synchronously, where the optical intensity pulses are modulated in phase into high-speed optical signals with chattering according to the high-speed data stream;

d. The high-speed optical signals are input to the optical fibers to transmit.

Another object of the present invention is to provide an optical signal transmission system implementing said optical signal modulation method, said system comprises:

An optical signal-emitting module;

Optical fiber links to amplify and transmit high-speed optical signals;

An optical signal-receiving module;

Wherein the optical signal-emitting module comprises of:
A continuous waveform laser to generate optical signals;

An intensity modulator to modulate the intensity of optical signals into optical intensity pulses;

A phase modulator to modulate the phases of optical intensity pulses into high-speed optical signals with chattering;

A high-speed data signal driver to generate high-speed data stream controlling intensity modulation and phase modulation.

Said optical fiber links comprise:

Transmitting optical fibers to transmit high-speed optical signals;

Two optical fiber amplifiers to amplify high-speed optical signals and implement full compensation to optical power;

A chromatic dispersion compensator to compensate the chromatic dispersion of high-speed optical signals;

Wherein, the chromatic dispersion compensator is series-wound between said two optical fiber amplifiers, which connect with said transmitting optical fiber and said optical signal-receiving module respectively at the other end.

According to the invention, the phase modulator added in the optical signal-emitting module of the optical signal transmission system modulates the phases of optical signals after intensity modulation so as to realize appropriate chattering modulation to optical intensity pulses. The phase modulation process will not alter the waveform of the optical signal pulses in Time Division, but it will actually alter the spectrum distribution, which will result in alteration in chromatic dispersion effect, non-linear effect, and interaction between them in the transmission of optical signal pulses. Therefore, appropriate chattering modulation can depress effectively the non-linear effect in the transmission of optical signal pulses through the interaction between chromatic dispersion and non-linear effects, which increases greatly the power input of individual channels and extends the passive relay regeneration distance of the system.

DETAILED DESCRIPTION OF THE DRAWINGS

DETAILED DESCRIPTION OF THE PREFERRED EMBODIMENT

Figure 1:
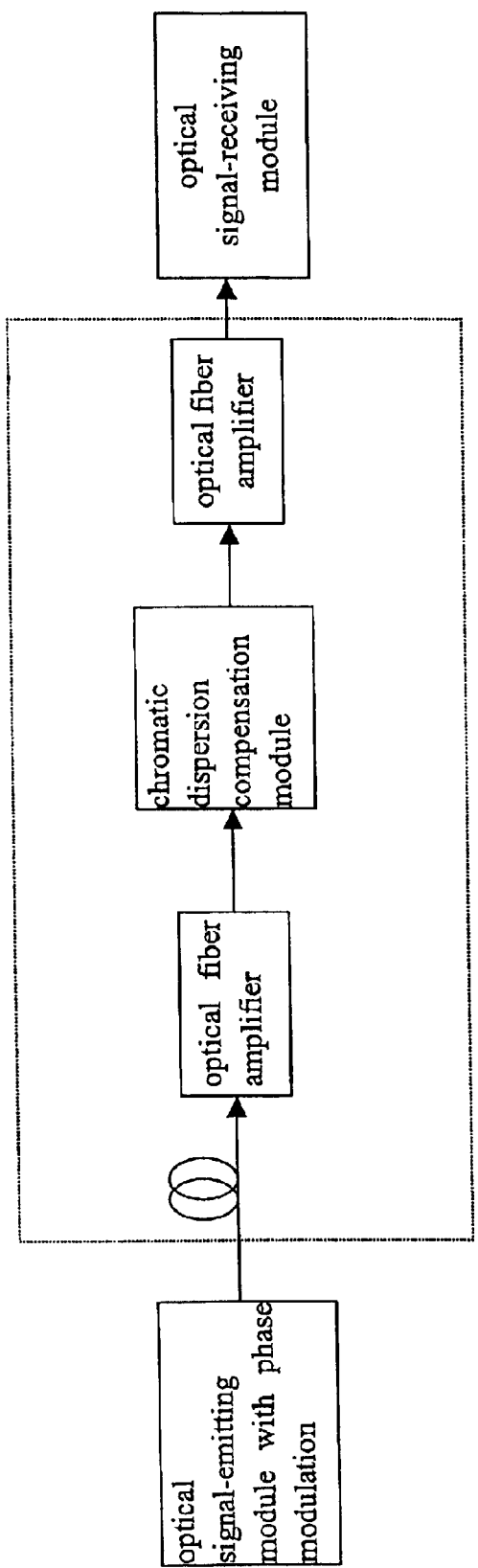
FIG. 1 is the schematic diagram of composition of the optical signal transmission system according to the invention.
Figure 2:
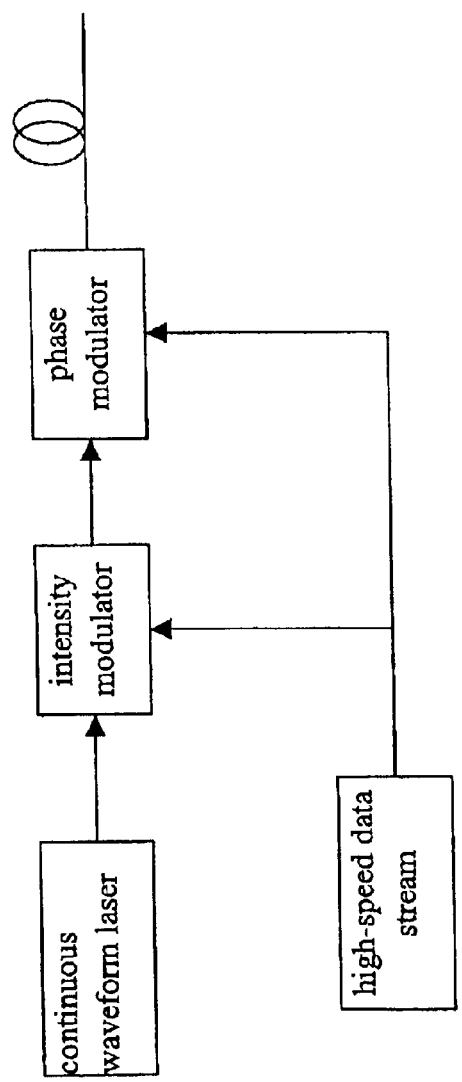
FIG. 2 is the schematic diagram of composition and structure of said optical signal-emitting module in FIG. 1.

The composition and implementation of the invention is described in detail according to the drawings:

The optical signal transmission system with phase modulation according to the invention is shown in FIG. 1, comprising:

An optical signal-emitting module, as shown in FIG. 2, comprising: a continuous waveform laser to generate optical signals; an intensity modulator to modulate the intensity of optical signals to attain optical intensity pulses; a phase modulator to modulate the phases of optical intensity pulses to attain high-speed optical signals with chattering; a high-speed data signal driver to generate high-speed data stream for controlling intensity modulation and phase modulation;

Optical fiber links (comprising: transmitting optical fibers to transmit high-speed optical signals; two optical fiber amplifiers to amplify high-speed optical signals and implement full compensation to optical power, in this case, EDFA is adopted; a chromatic dispersion compensator to compensate the chromatic dispersion of high-speed optical signals; the chromatic dispersion compensator is series-wound between said two optical fiber amplifiers which connect with said transmitting optical fiber and said optical signal-receiving module respectively at the other end) to amplify and transmit high-speed optical signals; and An optical signal-receiving module.

As shown in FIG. 1, the optical signal modulation method in the optical signal transmission system here comprises the following procedures:

a. A continuous waveform laser generates optical signals and a high-speed data signal driver generates a high-speed data stream;

b. The optical signals and high-speed data stream are input to an intensity modulator synchronously, where the optical signals are modulated into optical intensity pulses according to the high-speed data stream. In this embodiment, a M-Z interfering modulator is preferred to modulate the intensity of continuous optical signals generated from a CW laser to implement zero chattering to optical pulses after intensity modulation and facilitate subsequent phase modulation. The process comprises:

1. The optical signal generated from the continuous waveform laser is input to the optical inlet of the outer modulator, which will split the signal input into two parts, each of which will transmit on one of the two wave-guide arms respectively and converge and interfere with each other at the outlet.

Figure 3:
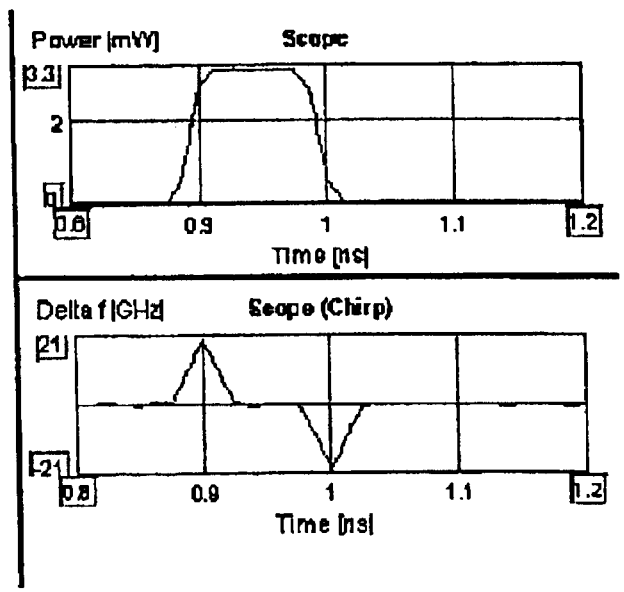
FIG. 3 is the schematic diagram of chattering of a single signal pulse after phase modulation.
Figure 4:
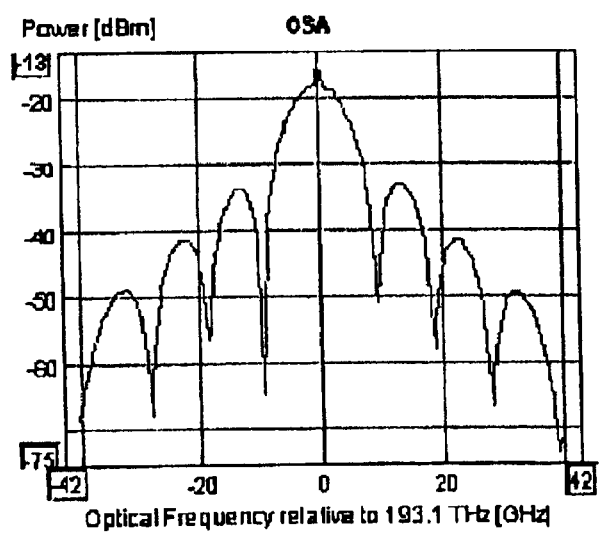
FIG. 4 is the diagram of spectrum distribution of optical signals before phase modulation.
Figure 5:
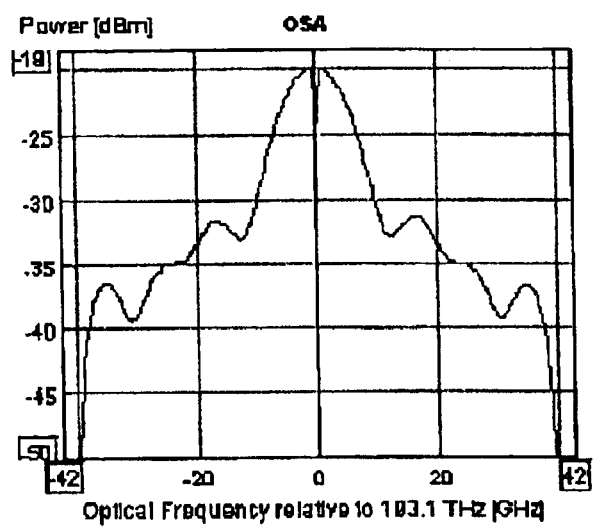
FIG. 5 is the diagram of spectrum distribution of optical signals after phase modulation.
Figure 6:
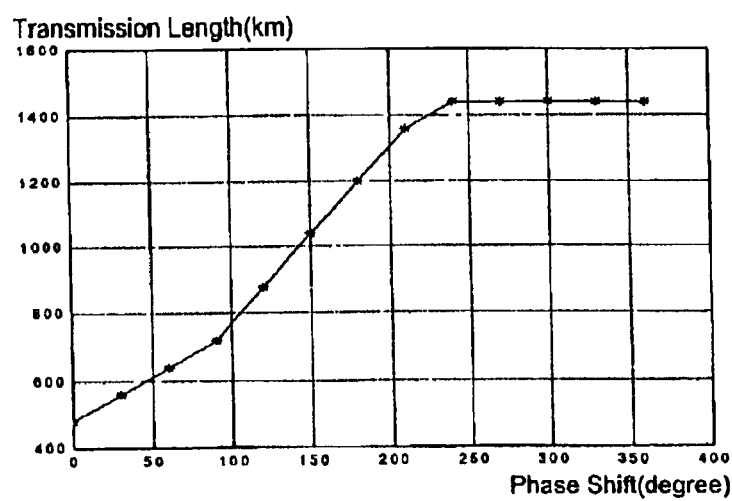
FIG. 6 is the schematic diagram of comparison between optical signal transmission distance before and after phase modulation.

2. The modulating voltage generated from the data driving circuit is input to the electric inlet of the outer modulator, where the refractive indexes of the waveguide are altered through alteration of modulating voltage by electro-optical effect. The altered refractive indexes in turn alter the phases of output on the two arms and phase difference between them. When the digital data signal is "1", the modulating voltage will make the phase difference between the outputs from the two arms an value of integer multiple of 2π, and the interference will result in a stronger optical pulse; however, when the digital data signal is "0", the modulating voltage will make the phase difference between the outputs from the two arms an value of integer multiple of π, and the interference result in zero output.

c. The optical intensity pluses modulated and the high-speed data stream are input to a phase modulator synchronously, where the optical intensity pulses are modulated in phase into high-speed optical signals with chattering according to the high-speed data stream; Wherein, The phase modulation process to the optical pulses by electro-optical effect in the phase modulator comprises:

1. The optical pluses after intensity modulation are input to the optical inlet of the phase modulator;

2. The modulating voltage generated from the driving circuit, which synchronize said optical pluses, is input to the electric inlet of the phase modulator. The modulating voltage is changed to alter the refractive indexes of the optical waveguide arms through electro-optical effect, and then the altered refractive indexes alter the phases of optical outputs. FIG. 4 and FIG. 5 clearly show the difference between optical spectrums before and after phase modulation. As shown in FIG. 3, at the ascending edge of optical pluses, the electric pulses ascend, too. The phase alternation of optical output will result in increase chattering of the frequency at the front edge of the optical pulses, i.e., blue shift (increase of the frequency); at descending edge of optical pulses, the electric pulses descend too, and the phase alternation of optical output will result in decrease chattering of the frequency i.e., red shift (decrease of the frequency) at the hind edge of optical pulses.

d. The high-speed optical signals after phase modulation are input to the transmitting optical fibers for long-distance transmission. FIG. 6 clearly shows that the optical signal transmission distance after phase modulation is much more than that without phase modulation.

What is claimed is:

1. An optical signal modulation method for high-speed transmission systems, comprising:

a. a continuous waveform laser generating optical signals, and a high-speed data signal driver generating a high-speed data stream;

b. the optical signals and high-speed data stream being input to an intensity modulator synchronously, wherein the optical signals are modulated into optical intensity pulses according to the high-speed data stream;

c. the optical intensity pulses modulated and the high-speed data stream being input to a phase modulator synchronously, wherein the optical intensity pulses are modulated in phase into high-speed optical signals with chattering according to the high-speed data stream;

d. the high-speed optical signals being input to the transmitting optical fibers.

2. An optical signal transmission system implementing the optical signal modulation method of claim 1, comprising:

an optical signal-emitting module;

optical fiber links amplifying and transmitting high-speed optical signals;

an optical signal-receiving module;

the optical signal-emitting module comprising:

a continuous waveform laser generating optical signals;

an intensity modulator modulating the intensity of optical signals into optical intensity pulses;

a phase modulator modulating the phases of optical intensity pulses to attain high-speed optical signals with chattering;

a high-speed data signal driver generating high-speed data stream controlling intensity modulation and phase modulation.

3. The optical signal transmission system of claim 2, wherein the optical fiber links comprise:

transmitting fibers transmitting high-speed optical signals;

two optical fiber amplifiers amplifying high-speed optical signals and implementing full compensation to optical power;

a chromatic dispersion compensator compensating the chromatic dispersion of high-speed optical signals;

the chromatic dispersion compensator being series-wound between said two optical fiber amplifiers, which connect with said transmitting fiber and said optical signal-receiving module respectively at the other end.

4. The optical signal transmission system of claim 3, wherein said optical fiber amplifier is a EDFA—Erbium-doped Fiber Amplifier.

* * * * *